United States Patent
Norwood et al.

[11] Patent Number: 6,139,481
[45] Date of Patent: Oct. 31, 2000

[54] GAS FIRED BURNER FOR SEALING SINGLE AND DOUBLE SIDED POLYCOATED PAPER CUPS

[75] Inventors: David W. Norwood, Joppatowne; Romano Balordi, Millers, both of Md.

[73] Assignee: Sweetheart Cup Company, Inc., Owings Mills, Md.

[21] Appl. No.: 09/283,252

[22] Filed: Apr. 1, 1999

[51] Int. Cl.[7] .............. B31B 1/90; F23D 14/06; F23D 14/65
[52] U.S. Cl. ................. 493/134; 493/108; 431/353
[58] Field of Search ................. 493/134, 104, 493/105, 106, 107, 108; 53/478, 329.2, 370.8, 370.9, 373.8, 373.9; 431/158, 350, 353, 264; 166/59

[56] References Cited

U.S. PATENT DOCUMENTS

| | | | |
|---|---|---|---|
| 2,260,166 | 10/1941 | Cope | 431/285 |
| 2,652,890 | 9/1953 | Morck, Jr. et al. | 431/158 |
| 3,130,649 | 4/1964 | Striplin et al. | 493/134 |
| 3,602,690 | 8/1971 | Rosenberg et al. | 219/373 |
| 3,648,573 | 3/1972 | Le Febvre et al. | 493/134 |
| 3,713,952 | 1/1973 | Shafer et al. | 493/134 |
| 3,849,058 | 11/1974 | Pankow | 431/353 |
| 3,977,306 | 8/1976 | Flynn | 493/31 |
| 4,042,317 | 8/1977 | Flynn | 432/134 |
| 4,050,888 | 9/1977 | Pfister et al. | 437/134 |
| 4,074,103 | 2/1978 | Feliks | 493/134 |
| 4,130,388 | 12/1978 | Flanagan | 431/352 |
| 4,232,590 | 11/1980 | Johnson | 497/105 |
| 4,317,323 | 3/1982 | Richards et al. | 493/108 |
| 4,323,343 | 4/1982 | Reeds et al. | 431/350 |
| 4,357,138 | 11/1982 | Johnson | 493/159 |
| 4,440,290 | 4/1984 | Johnson et al. | 198/803.9 |
| 4,549,866 | 10/1985 | Granville | 432/10 |
| 4,604,049 | 8/1986 | Katchka et al. | 431/350 |
| 4,680,023 | 7/1987 | Varano | 493/104 |
| 4,746,285 | 5/1988 | Guerra | 431/158 |
| 5,154,597 | 10/1992 | Fullemann et al. | 431/350 |
| 5,224,542 | 7/1993 | Hemsath | 166/59 |
| 5,226,585 | 7/1993 | Varano | 493/58 |
| 5,385,255 | 1/1995 | Varano et al. | 220/306 |
| 5,660,326 | 8/1997 | Varano et al. | 493/152 |
| 5,697,550 | 12/1997 | Varano et al. | 493/152 |
| 5,927,963 | 7/1999 | Wolcott et al. | 431/264 |

*Primary Examiner*—Peter Vo
*Assistant Examiner*—Louis K. Huynh
*Attorney, Agent, or Firm*—Nixon & Vanderhye P.C.

[57] ABSTRACT

In a cup sealing system including a cup former and at least one burner for sealing a cup bottom seam where a cup side wall blank is mated with a bottom disk, with one portion of the side wall extending beyond the bottom disk, an improvement wherein at least one burner includes a burner head with a plurality of circumferentially arranged flame nozzles and a pilot flame aperture, the pilot flame aperture adapted to be located axially adjacent the one portion of the cup side wall; a flame ignitor/sensor positioned adjacent the flame aperture; and a combustion chamber which extends from a forward edge of the burner at the flame nozzles to a location axially beyond the container side wall to thereby achieve uniform heating of the extended portion of the cup side wall. The burner head also includes a pair of relatively movable sleeves adapted to create an annular pilot flame ring gap on start-up.

12 Claims, 5 Drawing Sheets

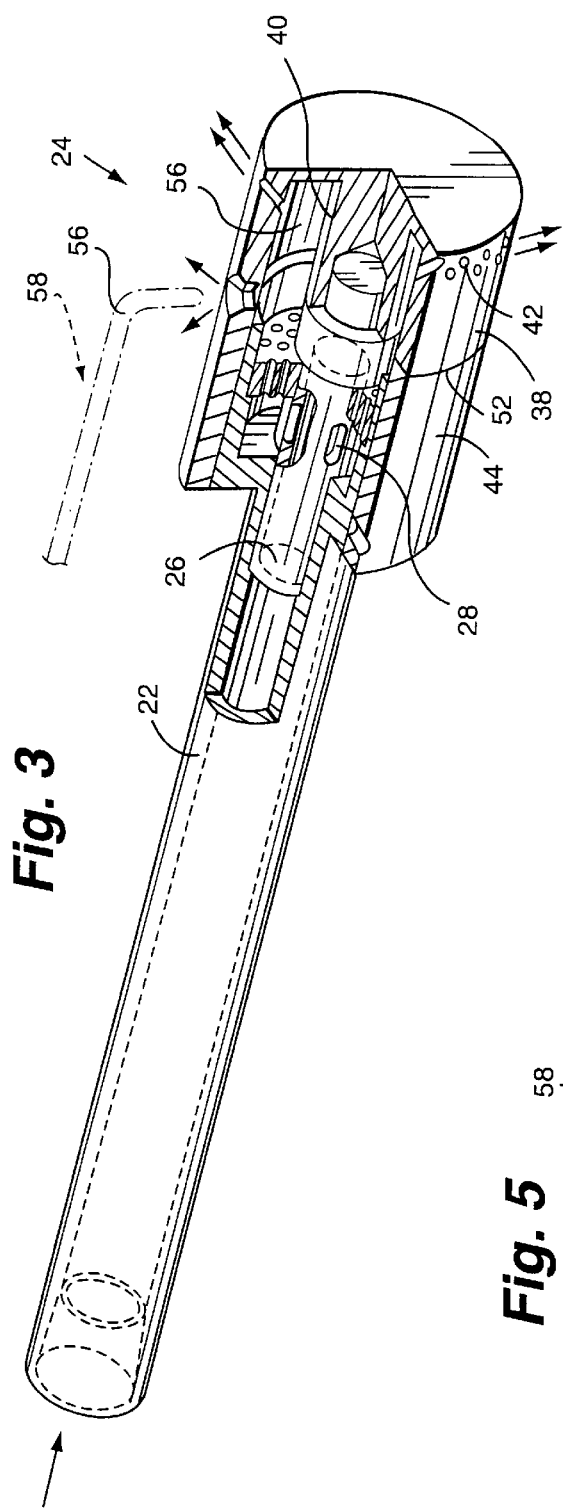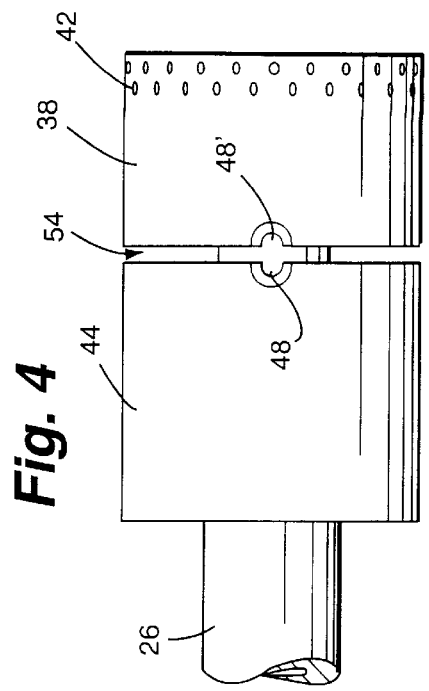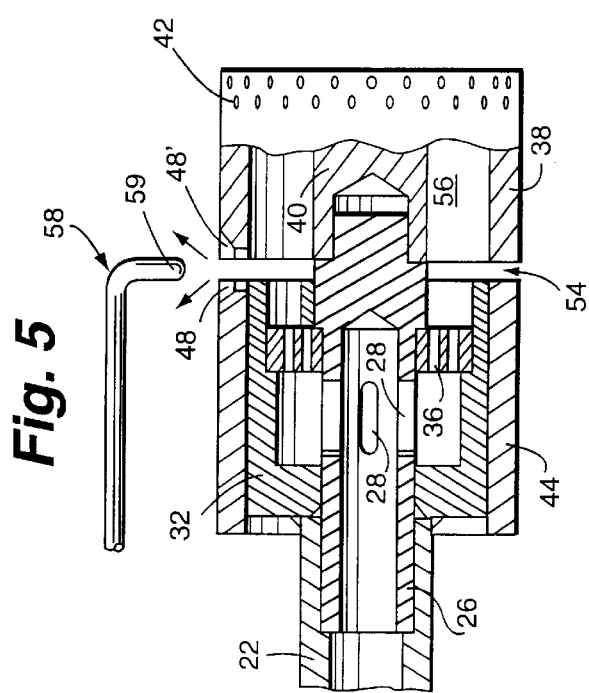

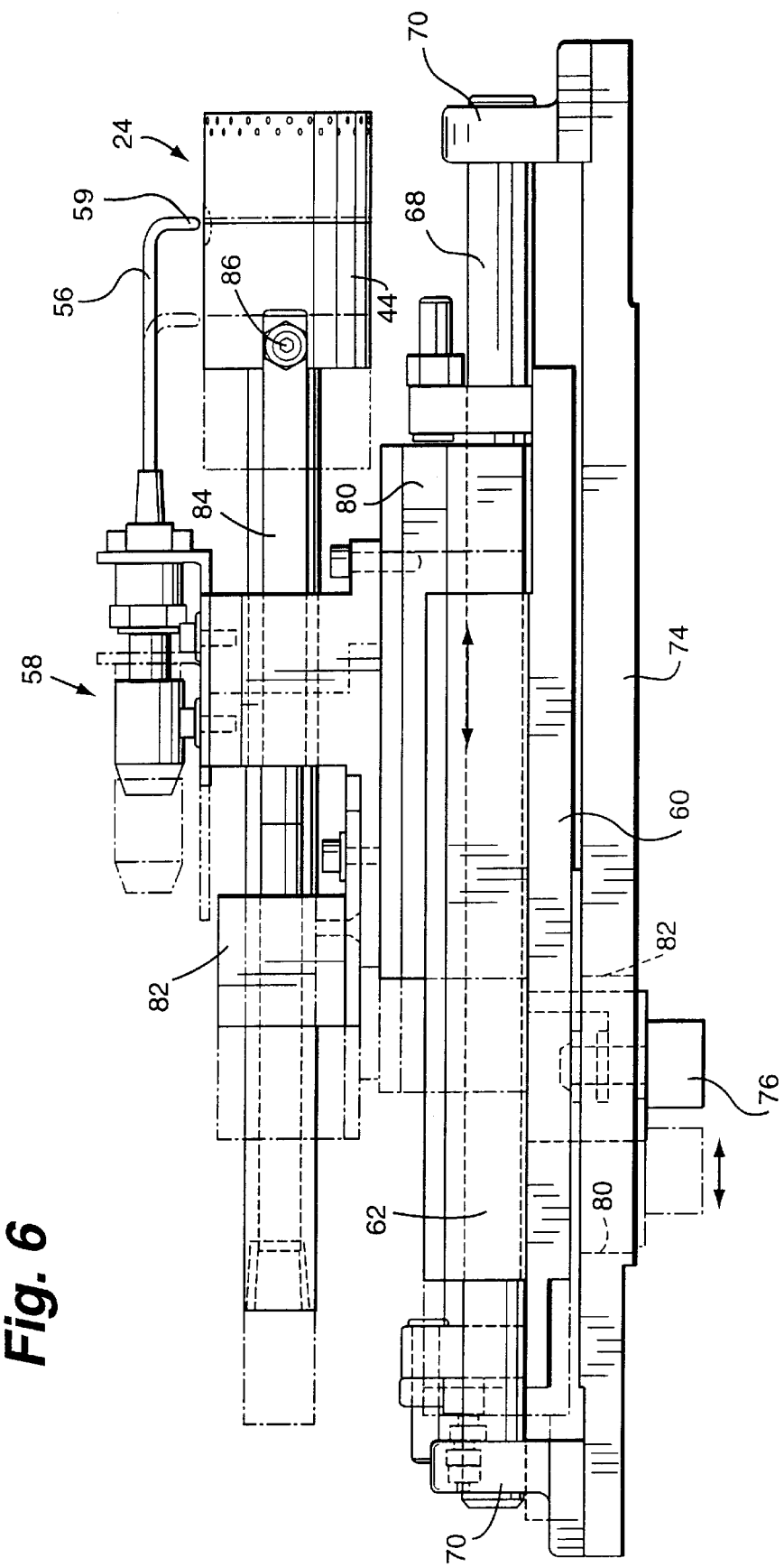

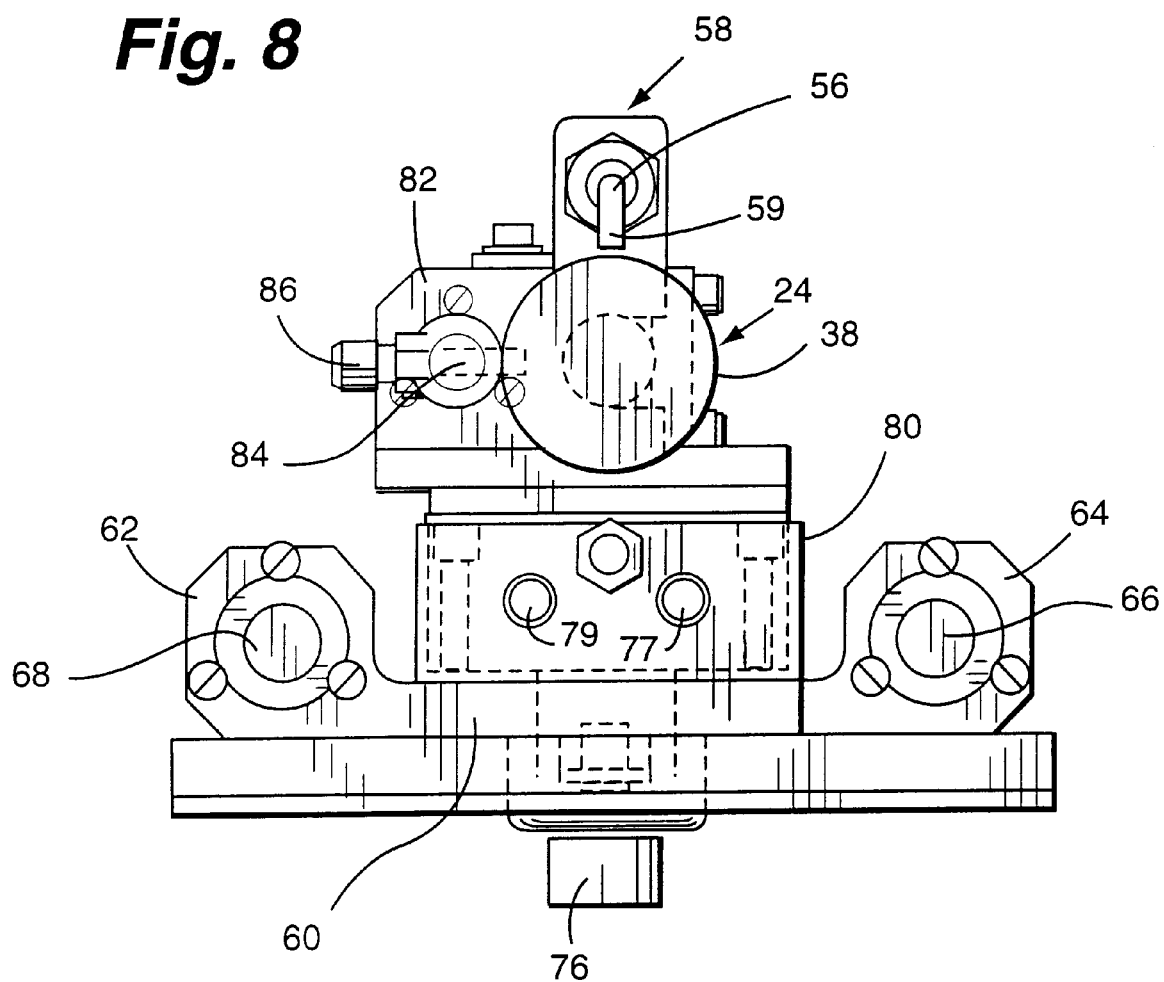

GAS FIRED BURNER FOR SEALING SINGLE AND DOUBLE SIDED POLYCOATED PAPER CUPS

TECHNICAL FIELD

This invention relates generally to container forming apparatus and, more specifically, to burners utilized to seal the bottom seam of polycoated paper cups.

BACKGROUND AND SUMMARY OF THE INVENTION

It is often necessary to apply localized heat in a very precise manner to heat portions of articles during the manufacture thereof. In one specific instance, paper cups or other containers have polycoated interior surfaces which must be heated rapidly and accurately in order to provide high quality, leak-proof seams during manufacture of the containers.

Various known means for heating paper cups, containers or other coated paper webs include direct flame heaters, indirect flame heaters, and other types of heaters which utilize secondary air to mix with and assist in flame combustion. Representative prior U.S. patent documents including U.S. Pat. Nos. 4,549,866; 4,042,317; and 3,977,306.

By way of background, a container blank is typically folded to form an axial side seam and essentially simultaneously mated with a flanged bottom disk. The side seam is typically a simple overlap of the blank edges, while the bottom seam typically involves rolling an extended side wall portion together with the disk flange to form an annular rolled seam about the bottom of the cup or container. For an effective bottom seam, the disk flange and the entire extended side wall portion must be sufficiently and uniformly heated. The assembly and sealing of the cups is typically performed as the cup blank is fed through a series of stations with the aid of a turntable indexed to the individual stations.

In one gas fired burner designed specifically to seal the bottom seam between a cup side wall and a cup bottom, a burner head is fitted to one end of a gas/air supply pipe, with the burner head having an outer diameter sufficiently small so that the burner head readily fits within the interior of the extended cup side wall at a location adjacent the bottom disk. Typically, such burner heads have a plurality of nozzles located about the periphery of the remote end of the head, as well as a pilot flame aperture adjacent the nozzles, with a flame ignitor/sensor device located in proximity to the pilot flame. The ignitor/sensor is associated with a control system which is effective to shut down the bottom burner (as well as other side seam burners) and the can forming apparatus if the pilot flame is out.

This arrangement has proved problematic, however, since the burner head diameter is necessarily kept small so that the pilot flame and flame ignitor/sensor device will also fit within the confines of the cup side wall. As a result, the flame nozzles are spaced farther away from the bottom seam than desired, and portions of the extended side wall are often insufficiently heated.

In accordance with this invention, the forward end of the burner head, and particularly the combustion chamber portion of the head, has been extended in length so that the pilot flame and flame sensor can be located axially behind, i.e., outside the cup bottom. At the same time, this has allowed an increase in the burner head outer diameter, such that the nozzles are moved closer to the seam. In addition, because the extended portion of the burner head includes the combustion chamber, that portion of the burner head which glows red extends throughout the entire axial length of the extended cup side wall portion, resulting in uniform heat distribution to the entire extended cup wall portion.

Another feature of the invention relates to the burner head being axially split into two sections, with the annular parting line passing through the pilot flame hole. With this arrangement, the rearward sleeve portion of the burner head can be retracted to form an annular pilot flame ring or gap. This facilitates ignition and rapid heat up, ensuring a stable flame. After a predetermined period of time, the rearward sleeve portion is moved forward to close the annular gap, leaving an otherwise conventional pilot flame aperture to perform the usual pilot flame function in cooperation with the flame sensor probe.

Accordingly, in its broader aspects, the present invention relates to a cup sealing system comprising a cup former and a plurality of burners for sealing different portions of the cup and related cup bottom, and specifically to an improvement wherein one of the plurality of burners is arranged to have a pilot flame at an orifice of the burner axially adjacent one portion of the cup; a flame sensor positioned radially adjacent the orifice to sense the presence or absence of the pilot flame; and wherein a combustion chamber of the burner extends from a forward edge of the burner to a location axially beyond the container side wall to thereby achieve uniform heating of the lower end of the cup.

In another aspect, the invention relates to a cup sealing system comprising a cup former and a plurality of burners for sealing different portions of the cup and related cup bottom wherein a cup side wall blank is mated with a bottom disk, with one portion of the side wall extending beyond the bottom disk; an improvement wherein one of the plurality of burners includes a burner head with a plurality of circumferentially arranged flame nozzles and a pilot flame aperture, the pilot flame aperture adapted to be located axially adjacent the one portion of the cup side wall; a flame ignitor/sensor positioned adjacent the flame aperture; and wherein a combustion chamber of the burner extends from a forward edge of the burner at the flame nozzles to a location axially beyond the container side wall to thereby achieve uniform heating of the extended portion of the cup side wall.

Other features of the invention will become apparent from the detailed description which follows.

BRIEF DESCRIPTION OF THE DRAWINGS

FIG. 3 is a perspective view, partly in section, of the burner in accordance with the invention;

FIG. 4 is a side elevation of the burner head as shown in FIG. 2, but with an outer sleeve portion retracted to expose an annular pilot flame ring or gap;

FIG. 5 is a section view of the burner head as shown in FIG. 4;

FIG. 6 is a side elevation of the burner head mounted on a movable carriage in accordance with the invention;

FIG. 8 is an end view of the apparatus shown in FIG. 6.

BRIEF DESCRIPTION OF THE DRAWINGS

Figure 1:
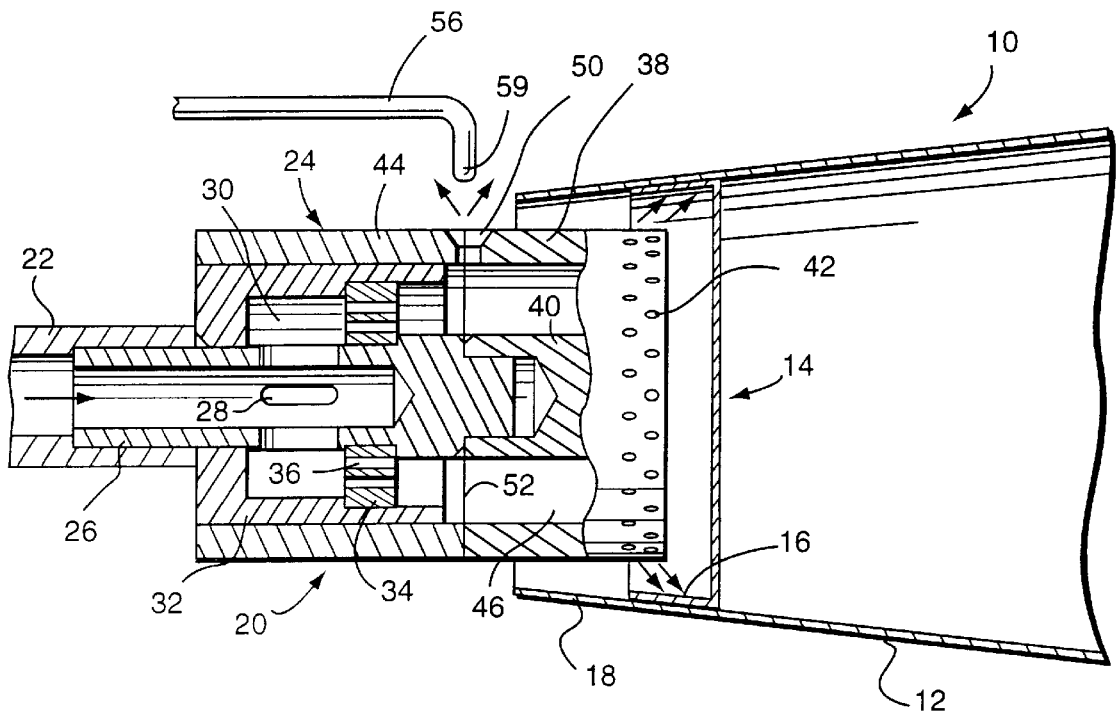
FIG. 1 is a side elevation, partly in section, of a gas fired burner in accordance with this invention, located in an operative position vis-à-vis a paper cup bottom to be sealed.

Turning to FIG. 1, a paper cup assembly 10 includes a cup side wall 12 and a cup bottom disk 14. It will be understood that the cup side wall includes an elongated side wall seam (not shown) sealed by conventional gas fired burners. This invention is concerned with the bottom seam between the cup side wall 12 and the bottom disk 14, and specifically a generally axially extending annular flange 16 extending about the periphery of the cup bottom disk 14. Prior to the actual seaming operation, that area of the cup bottom including the annular flange 16 as well as the extended portion 18 of the cup side wall extending beyond the flange 16 which is used to form a 360° rolled seam, must be heated rapidly and accurately in order to assure a high quality seam between the side wall and the cup bottom. Neither the cup materials employed, nor the seaming apparatus itself, however, form any part of this invention.

The gas fired burner head 20 in accordance with the invention includes a gas/air supply conduit 22 to which is secured at one end a burner head 24. The burner head 24 includes a forward fuel supply tube 26 welded to the conduit 22. The supply tube 26 is provided with a plurality of circumferentially spaced apertures 28 in the form of elongated slots, by which the fuel passes into an annular chamber 30 formed by a first sleeve 32 which is welded to the tube 26 behind or upstream of the slots 28. A disk 34 is mounted on the supply tube 26 forward of the slots 28 and has a plurality of axially extending apertures 36 through which the fuel passes, as further described below.

The supply tube 26 is closed at its forward end and supports a second forward sleeve 38 by means of an internal rod 40 welded to the closed end of the tube 26. Note that the rearward end of sleeve 38 is spaced axially from the forward end of sleeve 32. The sleeve 38 is closed at its forward end but has a plurality of radially extending burner holes or nozzles 42 in a circumferential array about the forward end of the sleeve. The number and peripheral spacing of the nozzles may be varied as desired.

Figure 2:
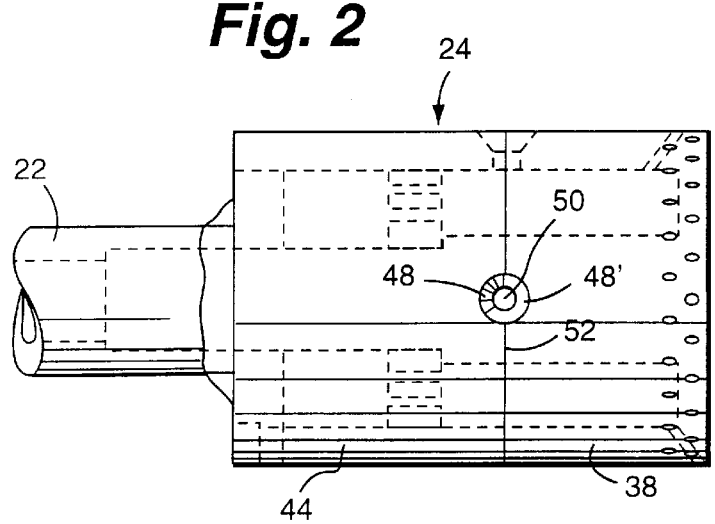
FIG. 2 is a side elevation of the burner head shown in FIG. 1.

A third retractable sleeve 44 is slidably mounted over the sleeve 32 for movement between extended (closed) and retracted (open) positions. In its extended position, the forward end of sleeve 32 abuts the rearward end of sleeve 38, as best seen in FIGS. 1 and 2. It will be noted here that the annular chamber about the rod 40 within sleeve 38, forward of the apertures 36 in disk 34 (including a portion of sleeve 44), forms the combustion chamber 46, between the forward end, the entire length of which turns "cherry red" in use. Semi-annular openings 48, 48' are aligned to establish a round pilot flame aperture 50 when the sleeve 44 is in its extended or closed position. Note that the parting line 52 between sleeves 32 and 38 passes through the aperture 50. When retracted, the sleeve 44 is axially spaced from sleeve 38, thereby creating an annular pilot flame ring or gap 54.

A conventional flame rod ignitor/flame sensor 56, including extended probe 58, is used to ignite and monitor the pilot flame, as further described below.

Another novel feature of this invention relates to the axial extension of the combustion chamber 46 by about 1½ inches (as compared to prior conventional burners), permitting the pilot flame aperture 50 to be located axially outside the cup bottom (FIG. 1). This, in turn, allows the outer diameter of the burner head 24 to be increased to thereby locate the nozzles 40 more closely adjacent the flange 16 of the cup bottom. At the same time, the combustion chamber 46 is now extended in length to also extend beyond the edge of the extended cup side wall portion 18. As a result of this construction, and because the entire axial extent of sleeve 38 turns cherry red during firing, the entire length of the extended cup side wall portion 18 is heated substantially uniformly, resulting in higher quality seaming of the cup bottom.

Figure 7:
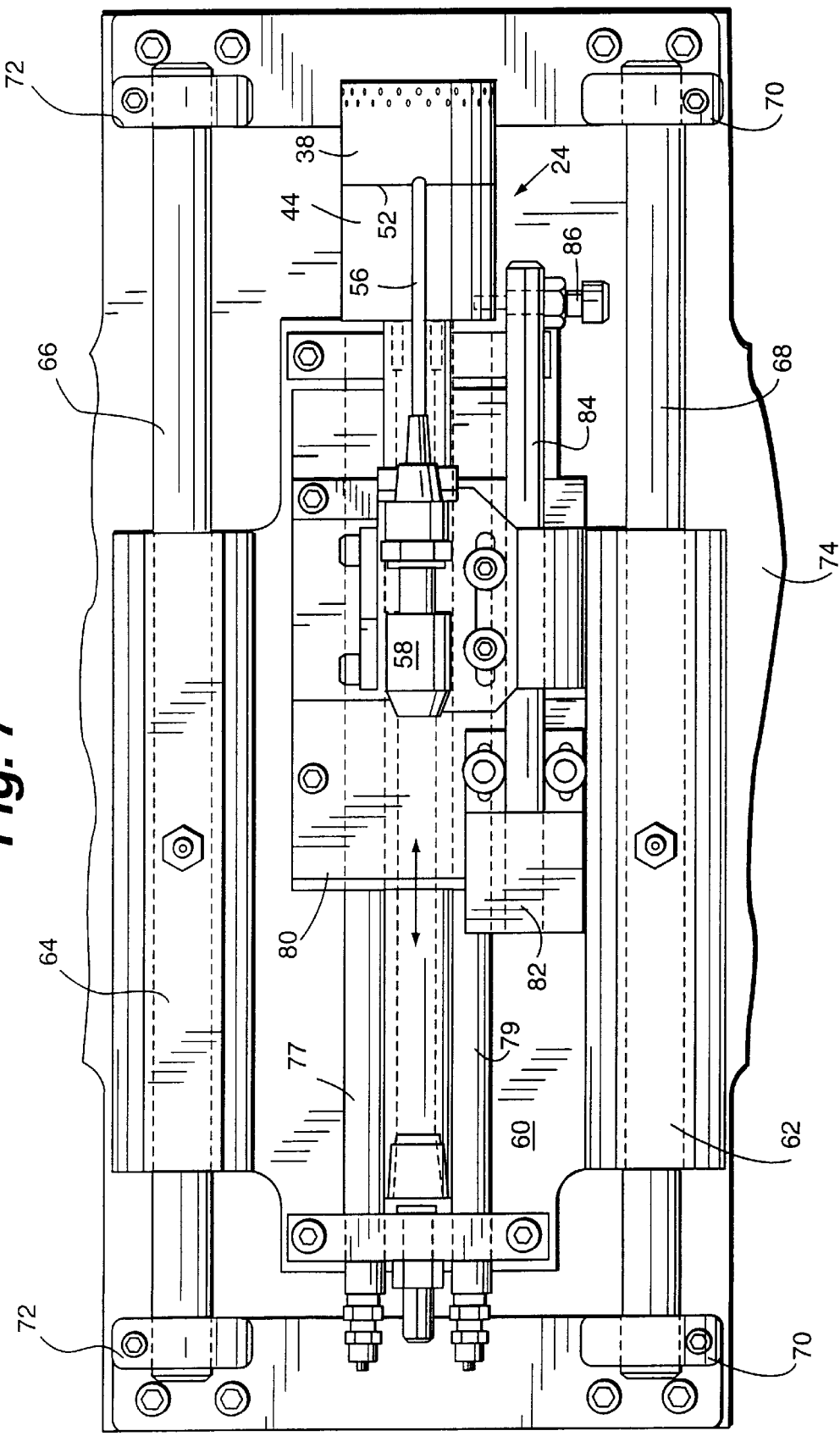
FIG. 7 is a plan view of the apparatus shown in FIG. 6.

Referring now to FIGS. 5 through 7, the burner head 24 is supported on a movable platform or carriage 60 comprising a substantially flat plate flanked by upstanding, elongated bushings 62, 64 which enable the carriage to move linearly along a pair of fixed rails 66, 68 supported by pairs of standards 70, 72, respectively, which are fixed to a base structure 74. The carriage 60 is moved toward and away from the cup bottom sealing station by a cam follower 76 fixed to the carriage, extending downwardly through a slot 78 (delineated by front and back surfaces 80, 82) formed in the base 74. The cam by which the carriage is reciprocated vis-a-vis engagement with cam follower 76 may be conventional and, in any event, is not part of this invention.

The burner head assembly 24 (including the flame ignitor/sensor unit 58) is movable on rails 77, 79 relative to the carriage 60 by an air cylinder 80. This permits precise adjustment of the burner head, within the overall stroke of the carriage as determined by the cam follower 76. In addition, a separate air cylinder 82 is connected via piston 84 and clevis pin 86 to the outer sleeve 38 of the burner head. Thus, air cylinder 82 is operative to move the sleeve rearwardly to thereby create the annular pilot ring gap 54, and to also close the sleeve 44 after the pilot flame is lit. With regard to the annular pilot ring gap 54, the retraction stroke of cylinder 82 need only be about ¼ inch. Note that the flame ignitor and flame sensor unit 58 is adjusted so that the tip 59 of the ignitor/sensor probe 58 is located immediately adjacent the parting line 52 at the pilot hole 50.

In use, the air cylinder 82 is actuated to retract the sleeve 54, thereby creating the annular pilot ring gap 54. With fuel air mixture supplied to the combustion chamber, the ignitor unit 58 ignites the pilot flame, utilizing additional air within the gap 54 to create a stable flame. The sleeve 44 remains in the retracted position for about 30 seconds until the flame reaches a predetermined stable temperature. Cylinder 82 is then actuated to close the sleeve 54, with a smaller pilot flame projecting from the closed pilot aperture 50. Throughout the course of the cup processing operation, the unit 58 senses the presence of the pilot flame. If the pilot flame goes out, the sensor unit 58 communicates with a suitable control panel to shut off the flow of fuel to the burner head assembly 24 (as well as other burners in the cup processing apparatus), and to also shut down the entire apparatus itself.

During the bottom seaming of the cup, as the individual cups are indexed on a conventional turntable to the position shown in FIG. 1, it will be appreciated that the burner head assembly 24 must be in a retracted position relative to the cup bottom under the control of the cam follower 76. Once the cup and bottom disk are in proper orientation, the cam follower 76 causes the burner head assembly including carriage 60 to move forwardly to the position shown in FIG. 1, with the burner head 24 located within the bottom of the cup. When the cup bottom is sufficiently heated, the cam follower 76 causes the burner head to retract, allowing the cup to be indexed to the seaming station, and the next cup to be oriented adjacent the burner head.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a cup sealing system comprising a cup former and at least one burner for sealing a cup bottom seam where a cup side wall blank is mated with a bottom disk, with one portion of the side wall extending beyond the bottom disk; an improvement wherein said at least one burner includes a burner head with a plurality of circumferentially arranged flame nozzles and a pilot flame aperture on said burner head, said pilot flame aperture adapted to be located axially adjacent said one portion of the cup side wall when said burner head is in a sealing position; a flame ignitor/sensor positioned radially adjacent the pilot flame aperture; and wherein in said sealing position a combustion chamber of the burner extends from a forward edge of the burner at said flame nozzles to a location axially beyond the cup side wall to thereby achieve uniform heating of the extended portion of the cup side wall.

2. The system of claim 1 wherein said flame nozzles are located in a peripheral surface of a forward sleeve of said burner head, said forward sleeve closed at a forward end thereof.

3. The system of claim 2 wherein said forward sleeve is adapted to axially abut a rearward sleeve, with a parting line extending through the pilot flame aperture.

4. The system of claim 3 including means for moving said rearward sleeve between an extended position where said rearward sleeve abuts said forward sleeve, and a retracted position where said rearward sleeve is axially spaced from said forward sleeve, thereby creating an annular pilot flame ring gap.

5. The system of claim 4 wherein said combustion chamber extends through said forward sleeve into said rearward sleeve.

6. The system of claim 4 wherein said burner head is fixed to a fuel supply pipe, said burner head comprising an internal fuel supply tube having a plurality of axially extending slots at a forward end thereof, and an annular disk fixed to a forward closed end of said supply tube, said disk having an array of axial apertures therein such that fuel in said supply pipe passes through said axially extending slots, said axially apertures, and into said combustion chamber.

7. The system of claim 6 wherein an internal sleeve is connected between said fuel supply tube and said annular disk such that an annular chamber is formed between said axially extending slots and said axial apertures.

8. The system of claim 1 including a carriage supporting said burner head for movement toward and away from the cup bottom seam.

9. A burner adapted to seal a seam in a paper cup, the burner comprising a burner head fixed to a fuel supply conduit, said burner head having forward and rearward sleeves, a combustion chamber, and a plurality of flame nozzle apertures in said forward sleeve and opening into said combustion chamber; said forward and rearward sleeves arranged to abut about an annular parting line and to move relative to each other to form an annular pilot flame ring gap.

10. The burner of claim 9 wherein a pilot flame aperture is located along said parting line so that said aperture has a closed periphery when said forward and rearward sleeves abut each other.

11. The burner of claim 9 wherein said rearward sleeve is movable and said forward sleeve is fixed relative to said rearward sleeve.

12. The burner of claim 9 in combination with a carriage supporting said burner head for movement toward and away from the paper cup.

* * * * *